US 6,665,249 B2

(12) United States Patent
Liew

(10) Patent No.: US 6,665,249 B2
(45) Date of Patent: Dec. 16, 2003

(54) METHOD AND APPARATUS TO INITIALIZE A MEMORY WITH RANDOM NUMBERS IN A DISC DRIVE

(75) Inventor: Bee-Bee Liew, Santa Clara, CA (US)

(73) Assignee: Oak Technology, Inc., Sunnyvale, CA (US)

( * ) Notice: Subject to any disclaimer, the term of this patent is extended or adjusted under 35 U.S.C. 154(b) by 298 days.

(21) Appl. No.: 09/804,313

(22) Filed: Mar. 12, 2001

(65) Prior Publication Data

US 2002/0126601 A1 Sep. 12, 2002

(51) Int. Cl.[7] .................................................. G11B 7/00
(52) U.S. Cl. .................... 369/59.1; 369/47.51; 369/47.1
(58) Field of Search .............................. 369/47.1, 47.51, 369/47.35, 53.1, 53.45, 59.1, 59.14, 59.22, 59.23

(56) References Cited

U.S. PATENT DOCUMENTS 5,778,069 A * 7/1998 Thomlinson et al. ........ 380/262
5,898,394 A * 4/1999 Kobayashi et al. ........... 360/39

* cited by examiner

Primary Examiner—Muhammad Edun
(74) Attorney, Agent, or Firm—Douglas S. Rupert; Wildman, Harrold, Allen & Dixon LLP

(57) ABSTRACT

A method and apparatus to initialize a memory with random data, including a pseudo-random number generator to generate random data; a selection circuit to provide selected data in response to a fill signal during an initialization state. The present invention can be used to provide statistically unbiased random data for writing to the power calibration area (PCA) of an optical disc.

17 Claims, 4 Drawing Sheets

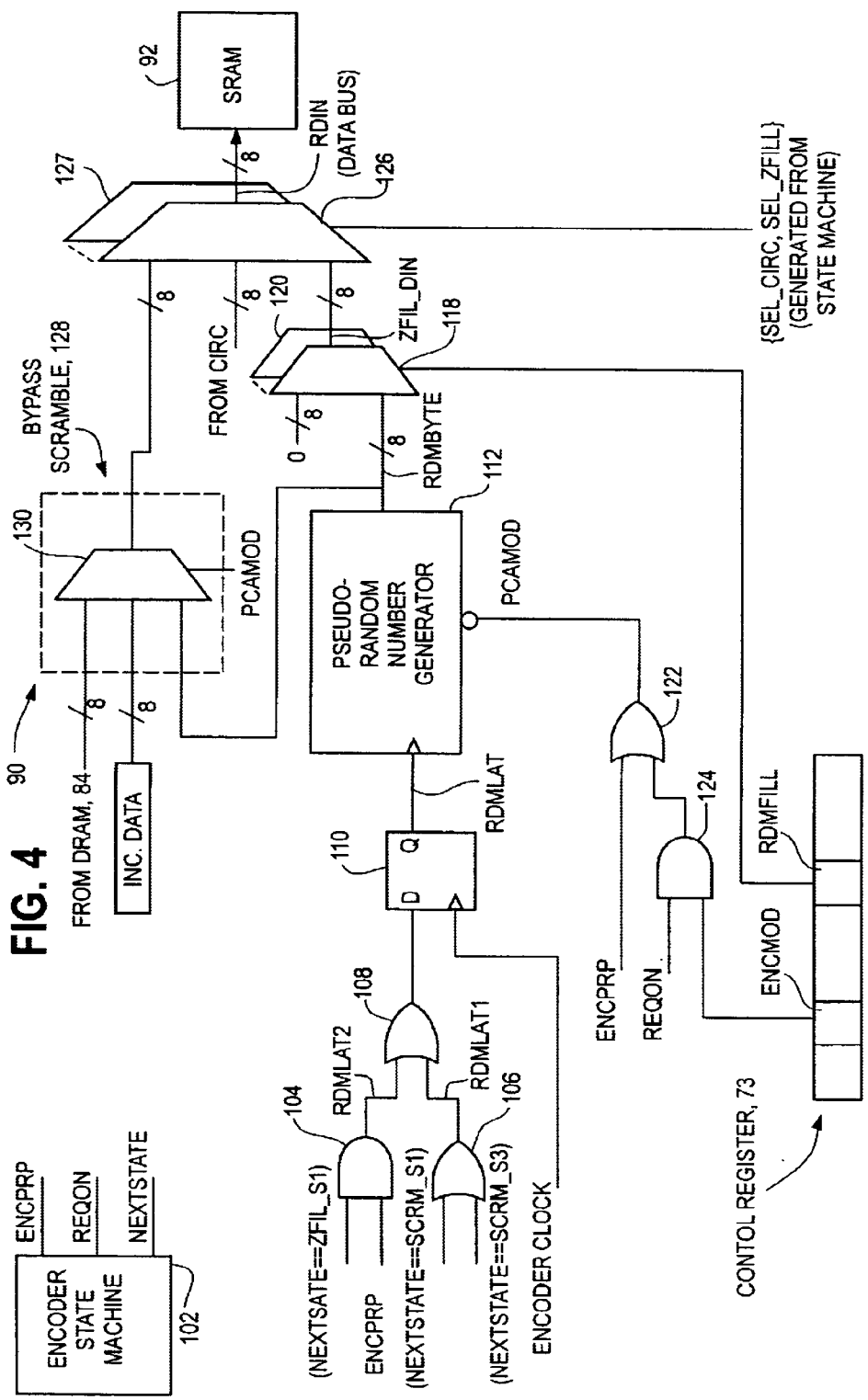

METHOD AND APPARATUS TO INITIALIZE A MEMORY WITH RANDOM NUMBERS IN A DISC DRIVE

BRIEF DESCRIPTION OF THE INVENTION

This invention relates generally to writing data to a disc drive including but not limited to a method and apparatus for initializing a memory in order to improve the writing of test data to an optical disc drive.

BACKGROUND OF THE INVENTION

To write data to an optical compact disc (CD)such as a CD-Recordable (CD-R) or a CD-Rewritable (CD-RW) disc, a laser is selectively energized to create a pattern corresponding to the information to be recorded on the disc media. Not all recording mediums are alike, however, and laser power settings must be adjusted to compensate for the differences. In order to adjust the laser power, the laser is fired initially at a test area on the disc. The test area is referred to as the power calibration area (PCA). The optimum power setting for a particular optical recording medium can be influenced by a number of variables including the recording speed, humidity, ambient temperature and the type of disc being used. Thus, the amount of write power is determined each time a disc recording is made.

When determining the optimum write power, random, eight-fourteen modulation (EFM) data is recorded at different power levels to the PCA. The recorded data is read back and the asymmetry of the data written at each write power is measured. In general, an optimum power setting is achieved when both high and low frequencies share the same level of asymmetry.

Prior to recording, the EFM test data is stored in a buffer memory. The memory is first initialized with a zero bit sequence. After initialization, a pseudo-random data generator is enabled and generates random data which is stored in the memory. The write operation starts by encoding the data stored in the memory and writing that data to the disc while simultaneously generating and storing random data in the memory. Because the memory is initialized with a zero-bit sequence, the zero-bit sequence is encoded and stored on the disc. As a result, the data written for write power calibration is not all random data, and the presence of the zero-bit sequence statistically biases the write calibration results. This statistical bias results in calibration errors which, in turn, result in errors in writing data to the disc.

In view of the foregoing, a method and apparatus that initializes a memory with random data rather than zeros would be useful for providing unbiased random data for use in a write power calibration test. Such a method and apparatus would greatly improve the selection of the optimum write power in CD-R and CD-Rewritable (CD-RW) disc drives and thus provide increased reliability and performance.

BRIEF DESCRIPTION OF THE DRAWINGS

The present invention is illustrated by way of example and not limitation in the figures of the accompanying drawings, in which like references indicate similar elements and in which:

FIG. 4 illustrates an exemplary circuit that initializes a memory with random data in accordance with the present invention.

FIG. 5 illustrates a block diagram of an encoder state machine in accordance with the present invention.

Like reference numerals refer to corresponding parts throughout the drawings.

DETAILED DESCRIPTION

Figure 1:
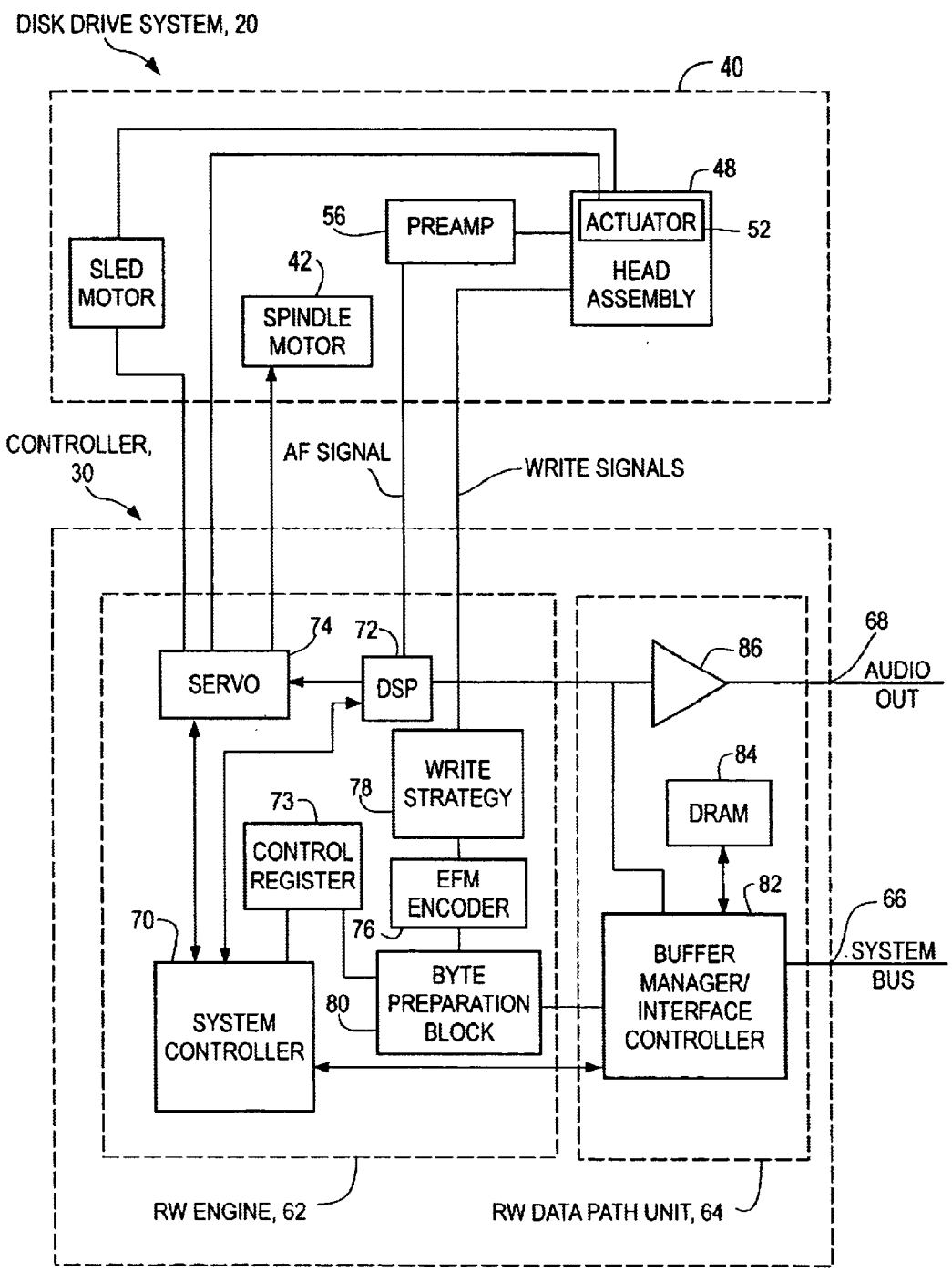
FIG. 1 illustrates a general architecture of a disc drive system in accordance with the present invention.

FIG. 1 is a block diagram of a disc drive system 20 including controller 30 and its associated disc drive 40. Disc controller 30 includes read/write (RW) engine 62 that connects to read/write data path unit 64. RW engine 62 communicates directly with disc drive 40 while the RW datapath unit 64 communicates data and control signals to and from system bus 66 and also supplies an audio signal to audio output line 68.

RW engine 62 includes system controller 70, digital signal processor 72 and servo control unit 74. System controller 70 receives commands from and sends status information to system bus 66 via RW datapath unit 64. In response to commands from system bus 66, system controller 70 sends commands to and receives status information from digital signal processor (DSP) 72 and servo control unit 74 to read data from or write data to a disc.

Servo control unit 74 positions head 48 with respect to a target track, and then keeps head 48 centered and focused on the target track. To do so, servo control unit 74 receives control signals from DSP 72. Servo control unit 74 sends signals to sled motor 54, actuator 52 and spindle motor 42 to control focusing and tracking. Servo control unit 74 communicates with spindle motor 42, actuator 52 and sled motor 54 to position optical head 48 precisely to read the desired information from a disc.

DSP 72 receives an analog read channel signal from preamplifier 56. The analog read channel signal includes both digital data and control information. DSP 72 processes the analog read channel signal and outputs control signals that are used by servo control unit 74.

Figure 2:
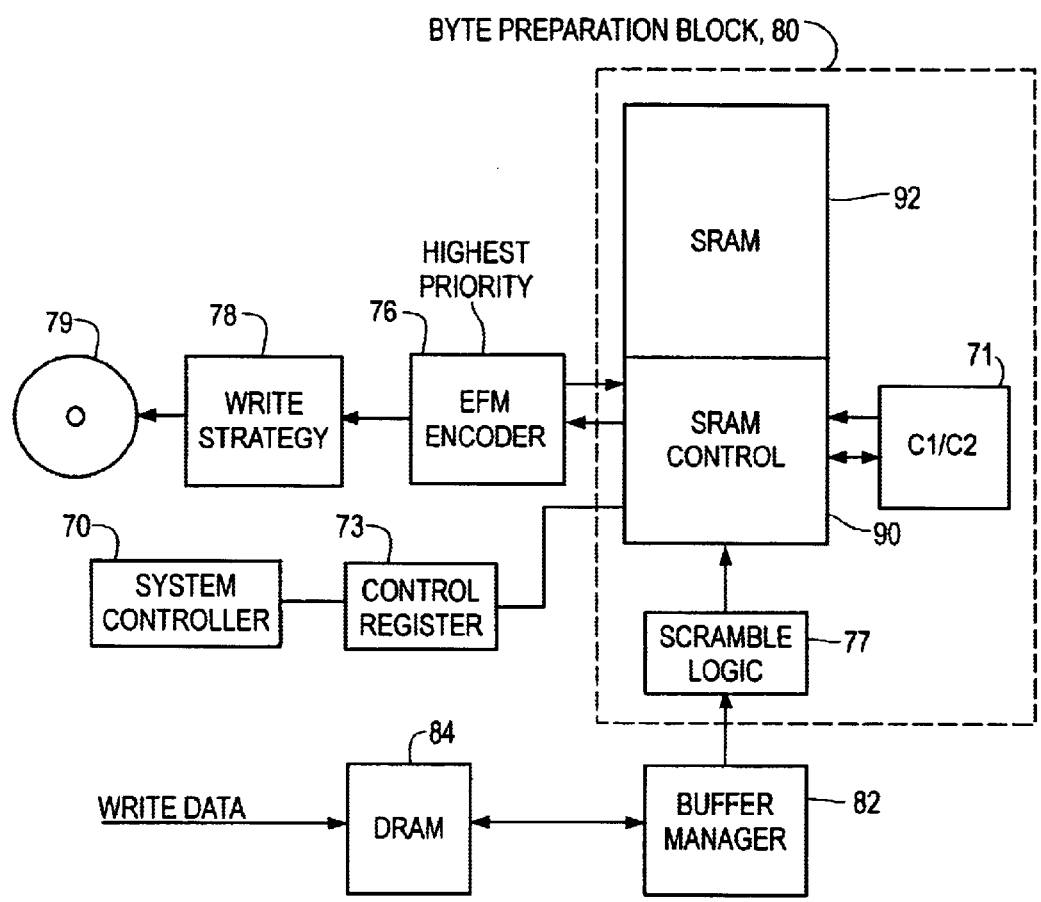
FIG. 2 illustrates a general architecture of a disc controller in accordance with the present invention.

Referring now to FIG. 2, to write data to a disc, byte preparation block 80 receives data bytes from read/write data path unit 64, and processes the data bytes. EFM encoder 76 receives the processed data bytes from byte preparation block 80, and encodes the data bytes to generate an EFM signal. Encoder 76 encodes the data bytes for a specified constant linear velocity of the disc. Write strategy circuit 78 receives the EFM signal and outputs the laser power control signals to write data to the disc. Byte preparation block 80 ensures that unbiased random data is stored on the disc when the optimum write power is determined as will be explained in more detail, below.

When writing data to a disc, buffer manager/interface controller 82 in read/write data path unit 64 receives the data from system bus 66, processes the data, and stores the data in dynamic random access memory (DRAM) 84. Buffer manager 82 sends the data bytes from DRAM 84 to EFM encoder 76, which subsequently flow to write strategy circuit 78. When reading data from the disc, buffer manager 82 receives the digital data signal from DSP 72 in a serial stream, descrambles the data, and assembles the data into eight-bit bytes. Buffer manager 82 then stores the data in DRAM 84. DRAM 84 acts as a buffer for the digital data from DSP 72. Buffer manager 82 also performs error detection and correction operations on the buffered data and transfers the data to the system bus 66.

When a write operation is initiated, system controller 70 sets one or more bits in control register 73 of encoder block 76 indicating a write operation is to be processed. Control register 73 governs the operations performed by static random access memory (SRAM) control 90. Buffer manager 82 supplies write data from DRAM 84 to scramble circuit 77 which generates scrambled write data. Scramble circuit 77 rearranges bytes of the write data in a predetermined pattern as would be familiar to those of ordinary skill in the art. SRAM control block 90 stores the scrambled write data in SRAM 92. SRAM control block 90 controls the filling of SRAM 92, supplying addresses and timing signals. SRAM control block 90 also supplies the data stored in SRAM 92 to C1/C2 encoder 71 which generates C1/C2 parity data in accordance with predefined C1 and C2 encoding rules familiar to those of ordinary skill in the art. After C1/C2 encoding, the C1/C2 encoded data is returned to SRAM 90. The C1/C2 encoded data is then passed to EFM encoder 76 and write strategy circuit 78 for final processing in preparation for writing to disc. The data output from write strategy circuit 78 is then written to disc 79. Write strategy circuit 78 generates laser control signals to head assembly 48 to write the EFM data stream on the disc. During a write operation, data continuously flows from DRAM 84 through buffer manager 82 to byte preparation block 80, EFM encoder 76, and write strategy circuit 78. Scramble circuit 77 and C1/C2 encoder 71 operate concurrently to process the data.

Figure 3:
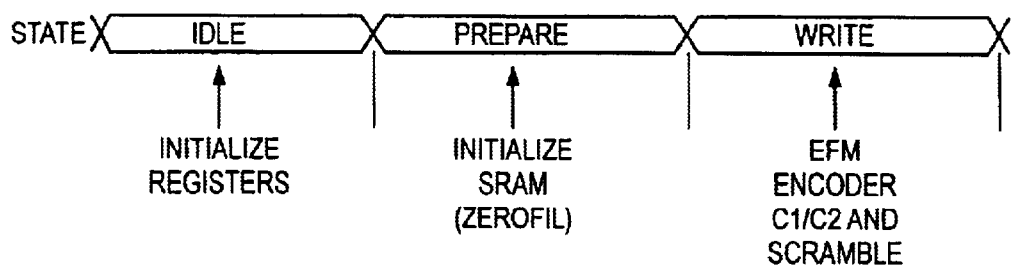
FIG. 3 illustrates a timing diagram of the operation of the disc controller of FIG. 2 in accordance with the present invention.

As noted, before writing to a disc, it is necessary to determine the optimum write power to use by writing test data to the PCA of the disc. The present invention provides a stream of random data without the zero biased data of prior art systems to SRAM 90 for writing to the PCA. As shown in FIG. 3, three general states are used to perform the PCA write operation according to the present invention. During an IDLE state, registers, such as control register 73 of encoder block 76, are initialized. During a PREPARE state, SRAM 92 is initialized with data. In the past, as noted, SRAM 92 has been initialized with zeroes. In accordance with an embodiment of the present invention, SRAM 92 can be initialized with random data or with zeroes. During a WRITE state, data from SRAM 92 is written to disc.

FIG. 4 illustrates an exemplary circuit for initializing a memory with random data or zeroes in accordance with an embodiment of the present invention. FIG. 5 illustrates encoder state machine 102.

Initially, encoder state machine 102, which is a part of SRAM control 90, is IDLE. When a write operation is initiated, encoder state machine 102 receives a signal from system controller 70 to move to the next state and generates the ENCPRP signal which indicates the PREPARE state. ANDgate 104 receives the ENCPRP signal and generates the rdmlat2 signal upon receipt of nextstate==zfil_s1. Nextstate==zfil_s1 is generated by SRAM control 90 indicating that SRAM 92 is available for initializing. SRAM control 90 arbitrates requests from devices that transfer data to or from SRAM 92 and determines which device (i.e., EFM encoder 76, C1/C2 encoder 71, scramble logic 77) should be granted access to SRAM 92 at a particular time. OR-gate 106 accepts signals next state==scrm_s1 or nextstate==scrm_s3 which are also generated by SRAM control 90 when SRAM 92 is available for transfer of the high and low bytes of data from scramble logic 77. OR-gate 92 outputs the rdmlat1 signal to one input of OR-gate 108 when either next state==scrm_s1 or nextstate==scrm_s3 are asserted. Rdmlat2 is asserted by AND gate 108 when next state==zfil_s1 and the ENCPRP signal is generated by encoder state machine. Flip-flop 110 outputs rdmlat to clock pseudo random number generator 112 upon assertion of either rdmlat2 or rdmlat1 and the encoder clock. Thus, rdmlat1 is asserted during the WRITE state and rdmlat2 is asserted during the PREPARE state. In this way, pseudo random number generator is latched upon assertion of either rdmlat1 or rdmlat2 in sync with the encoder clock signal. Thus, flip-flop 110 ensures that pseudo random number generator 112 will be clocked in sync with the encoder clock signal and that it is ready to generate random numbers during both the WRITE and PREPARE states of encoder state machine 102 upon being enabled.

Figure 6:
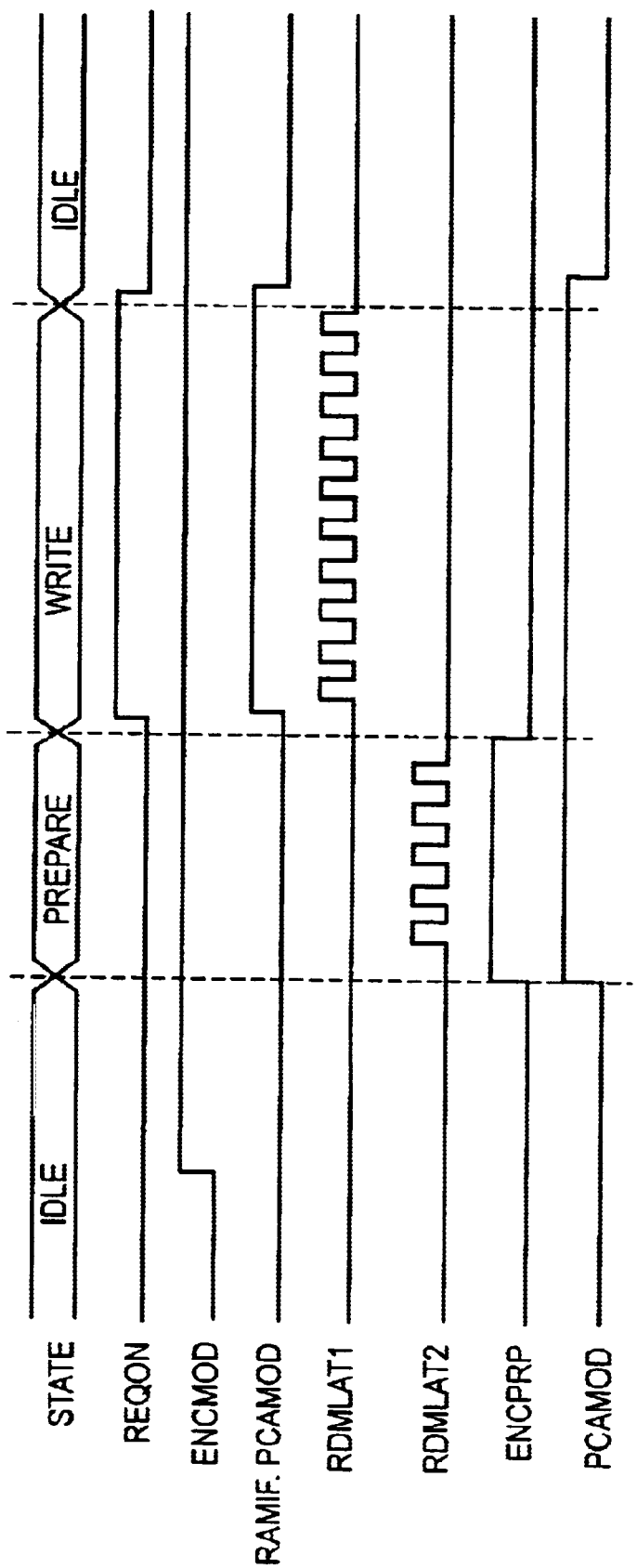
FIG. 6 illustrates the timing of the circuits of FIGS. 4 and 5 in accordance with the present invention.

OR gate 122 generates a pcamod signal. Pseudo random number generator 112 is enabled by NOT pcamod. One input to OR gate 122 is the ENCPRP signal generated by encoder state machine 102 representing the PREPARE state. The other input to OR gate 122 is driven by the output of AND gate 124 shown as the ramif.pcamod signal on FIG. 6. AND gate 124 is driven by two inputs, the REQON (WRITE state) signal from encoder state machine 102 and the ENCMOD bit from control register 73 which is set by system controller 70 when random data is to be written to the PCA. Thus, pseudo random number generator 112 is enabled during both the PREPARE state and the WRITE state of encoder state machine 102 (if, in the latter case, the ENCMOD bit has been set in control register 73). Thus, pseudo random number generator provides a stream of random data during the PREPARE and WRITE states so that SRAM 90 can be initialized with random data.

Pseudo-random number generator 112 generates two bytes of random data. The lower order byte is supplied to selection circuit 118. The higher order byte is supplied to selection circuit 120. To initialize SRAM 92 with random data, as opposed to zeroes, prior to beginning the write operation a control bit (rdmfill) is set in control register 73; otherwise, SRAM 92 will be initialized with zeroes. The rdmfill bit is used to select between the inputs set to zero for conventional initializing of SRAM 92 with zeros and the rdmbyte inputs of selection circuits 118 and 120.

When data is written to the PCA scramble logic 77 is bypassed. This bypass function is handled by bypass scramble circuit 128. Selection circuit 130 of bypass scramble circuit 128 is enabled by the pcamod signal from OR gate 122. Thus, whenever pseudo-random number generator 112 is enabled, scramble logic 77 is bypassed. Selection circuit 118 outputs either zeroes or the low order byte of random data (rdmbyte) in response to the rdmfill bit in the control register 73.

The outputs of selection circuit 118 and selection circuit 120 are provided to a second bank of selection circuits 126 and 127. Selection circuits 126 and 127 select among the outputs of selection circuits 118 and 120 (either zeroes or random numbers, as noted) and the cross interleaved Reed-Solomon encoded data (CIRC) or data from the output of bypass scramble circuit 128. The selection is determined by sel_circ, sel_zfill signals generated by a state machine of disc controller 70. As would be familiar to those of ordinary skill, an address bus provides addresses to SRAM 92 for loading data from selection circuits 126 and 127 into memory.

The present invention may also be used to write data to other discs such as DVD-RAM or DVD-RW, and in general will be useful in any optical disc controller that uses random test data to determine the optimum write power for writing data to a disc.

As would be known by those of ordinary skill in the art, a variety of devices could perform the functions called for by the present invention. For example, in all cases where a specific switching device is specified, such as a multiplexer or a particular logic gate, alternative switching devices, logic gates or combinations of gates, programmable logic arrays, or other switch mechanisms could be employed. Of course, many different configurations could be used to replace or supplement the logic gates and other switching devices shown, as would be known to one of ordinary skill in the art.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A circuit comprising:
   a memory;
   a pseudo-random number generator to generate random data;
   a state machine that comprises a state for initializing the memory,
   a circuit, comprising a selection circuit, that provides the random data to the memory during the state for initializing the memory,
   wherein the selection circuit provides selected data comprising the random data and a sequence of zeros in response to a selection signal from a controller.

2. The circuit of claim 1 wherein the selected data further comprises cross-interleaved Reed-Solomon encoded data.

3. The circuit of claim 2 wherein the selection circuit comprises:
   a first multiplexer to provide first selected data in response to the fill signal, the first selected data being selected from the group consisting of (A) the random data and (B) the zero bit sequence; and
   a second multiplexer to provide the selected data in response to a second signal, selected from the group consisting of (A) the first selected data and (B) the cross-interleaved Reed-Solomon encoded data.

4. A circuit comprising:
   a memory;
   a pseudo-random number generator to generate random data;
   a state machine that comprises a state for initializing the memory,
   a circuit that provides the random data to memory during the state for initializing the memory wherein the state machine comprises a state for writing to the memory and wherein the pseudo-random number generator generates random data in response to an enable signal, the enable signal generated by a circuit comprising:
   a first logic gate to receive a write request signal and an encode modify signal, the first logic gate producing a first signal that is selectively asserted during the write state; and a second logic gate to receive the first signal and an encode prepare signal, the encode prepare signal being asserted during the state for initializing the memory, the second logic gate producing the enable signal to enable the pseudo-random number generator to generate the random data, when either the encode prepare signal or the first signal is asserted.

5. A disc controller that initializes a memory with random data, comprising:
   a pseudo-random number generator to generate random data;
   a selection circuit to provide selected data in response to a fill signal, the selected data being selected from a group comprising the random data and a zero bit sequence;
   a memory to store the selected data in response to one or more signals representing an initialization state and one or more signals representing a write state;
   at least one encoder to provide encoded selected data during the write state; and
   a write strategy circuit to supply the encoded selected data to head to write on a disc during the write state.

6. The disc controller of claim 5 further comprising:
   a register to provide the fill signal.

7. The disc controller of claim 5 further comprising:
   a state machine to generate the one or more signals representing the initialization state and the one or more signals representing the write state.

8. The disc controller of claim 5 further comprising:
   an AND gate to receive a write request signal and an encode modify signal to produce a first signal that is asserted during the write state; and
   an OR gate to receive the first signal and an encode prepare signal, the encode prepare signal being asserted during the initialization state, the OR gate to produce an enable signal to enable the pseudo-random number generator to generate the random data, when either the encode prepare signal or the first signal are asserted.

9. The disc controller of claim 5 wherein the selection circuit comprises at least one multiplexer.

10. The disc controller of claim 5 wherein, in response to the fill signal and a second signal, the selection circuit provides the selected data from the group comprising the random data, the zero bit sequence and cross-interleaved Reed-Solomon encoded data.

11. The disc controller of claim 10 wherein the selection circuit comprises:
   a first multiplexer to provide first selected data, in response to the fill signal, which is selected from the group comprising the random data and the zero bit sequence; and
   a second multiplexer to provide the selected data, in response to the second signal, selected from a group comprising the first selected data and the cross-interleaved Reed-Solomon encoded data.

12. A method of initializing a memory with random data, comprising:

generating random data;

initializing the memory by storing an initial set of random data in at least a portion of the memory;

beginning a write operation by encoding the initial set of random data in the memory to provide encoded initial random data;

writing the encoded initial random data on a disc;

storing additional random data in the memory;

encoding the additional random data in the memory to provide additional encoded random data; and writing the additional encoded random data on the disc.

13. The method of claim 12 wherein the step of initializing initializes the memory by storing the initial set of random data in response to a fill selection bit.

14. The method of claim 12 wherein the step of initializing comprises initializing the memory by storing an initial set of random data or a sequence of zeros in the memory.

15. A method of initializing a memory with random data, comprising:

during a prepare state:

initializing the memory by storing an initial set of random data in at least a portion of the memory; and during a write state:

beginning a write operation by encoding the initial set of random data in the memory to provide encoded initial random data;

writing the encoded initial random data on a disc;

storing additional random data in the memory;

encoding the additional random data to provide additional encoded random data;

and writing the additional encoded random data on the disc.

16. The method of claim 15 wherein the memory is initialized with random data to provide statistically unbiased random data for writing to the power calibration area (PCA) of an optical disc.

17. A method of calibrating the power setting of a laser used for writing data to a disc, comprising:

initializing a memory at least in part with random data;

beginning a write operation by encoding the initial set of random data in the memory to provide encoded initial random data;

writing the encoded initial random data to a power calibration area of the disc;

storing additional random data in the memory;

encoding the additional random data to provide additional encoded random data;

and writing the additional encoded random data to the power calibration area of the disc.

* * * * *